(12) United States Patent
Sutherland

(10) Patent No.: US 7,688,518 B2
(45) Date of Patent: Mar. 30, 2010

(54) FLUID LENS LATERAL SHIFTING

(75) Inventor: James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 365 days.

(21) Appl. No.: 11/978,302

(22) Filed: Oct. 29, 2007

(65) Prior Publication Data

US 2009/0109544 A1   Apr. 30, 2009

(51) Int. Cl.
 *G02B 1/06* (2006.01)
(52) U.S. Cl. ........................ 359/665; 359/666
(58) Field of Classification Search .......... 359/665–667
 See application file for complete search history.

(56) References Cited

U.S. PATENT DOCUMENTS

| | | | | |
|---|---|---|---|---|
| 6,778,328 | B1 | 8/2004 | Aizenberg et al. | 359/665 |
| 6,936,809 | B2 | 8/2005 | Viinikanoj | 250/216 |
| 7,006,299 | B2 | 2/2006 | Kroupenkine | 359/665 |
| 2005/0002113 | A1 | 1/2005 | Berge | 359/666 |
| 2006/0126190 | A1 | 6/2006 | Berge et al. | 359/665 |
| 2006/0152814 | A1 | 7/2006 | Peseux | 359/665 |
| 2007/0103790 | A1 | 5/2007 | Berge | 359/666 |
| 2007/0115450 | A1* | 5/2007 | Nagasaka et al. | 355/72 |
| 2007/0133104 | A1 | 6/2007 | Oh | 359/666 |
| 2007/0156021 | A1 | 7/2007 | Morse et al. | 600/167 |
| 2007/0178405 | A1* | 8/2007 | Kanda et al. | 430/270.1 |

FOREIGN PATENT DOCUMENTS

| | | |
|---|---|---|
| WO | WO2004/051323 | 6/2004 |
| WO | WO2004/102250 | 11/2004 |
| WO | WO2007/058451 | 5/2007 |

\* cited by examiner

*Primary Examiner*—Scott J Sugarman
(74) *Attorney, Agent, or Firm*—Gregory V. Bean; Dinsmore & Shohl, LLP

(57) ABSTRACT

According to one embodiment of the present invention, a method of constructing a fluid lens is provided. The method comprises establishing a generalized sidewall profile function and converting the generalized sidewall profile function to a plurality of lens sidewall contact angle functions defined by different combinations of sidewall profile parameters. Thereafter, the method comprises determining respective degrees of operational linearity of the lens sidewall contact angle functions over a range of positions along the x axis by assessing derivative uniformity of each of the lens sidewall contact angle functions within an established slope flatness metric ϵ. The respective degrees of operational linearity of the lens sidewall contact angle functions are then evaluated to identify an optimized sidewall profile. A fluid lens is then constructed by forming the fluid lens reservoir having at least one sidewall with the optimized sidewall profile.

19 Claims, 5 Drawing Sheets

US 7,688,518 B2

FLUID LENS LATERAL SHIFTING

BACKGROUND

Embodiments of the present invention relate to methods of constructing fluid lenses and, more particularly, to methods of optimizing sidewall profiles of fluid lenses.

SUMMARY

According to one embodiment of the present invention, a method of constructing a fluid lens is provided. The method comprises establishing a generalized sidewall profile function and converting the generalized sidewall profile function to a plurality of lens sidewall contact angle functions defined by different combinations of sidewall profile parameters. Each of the lens sidewall contact angle functions is characterized by a degree of operational linearity between a lens sidewall contact angle and a target lens fluid lateral shift along an x axis. Thereafter, the method comprises determining respective degrees of operational linearity of the lens sidewall contact angle functions over a range of positions along the x axis by assessing derivative uniformity of each of the lens sidewall contact angle functions within an established slope flatness metric $\epsilon$. The respective degrees of operational linearity of the lens sidewall contact angle functions are then evaluated to identify an optimized sidewall profile. A fluid lens is then constructed by forming the fluid lens reservoir having at least one sidewall with the optimized sidewall profile.

According to another embodiment of the present invention the method comprises determining respective degrees of operational linearity of the lens sidewall contact angle functions over a range of positions along the x axis, including a position where x=0, by assessing derivative uniformity of each of the lens sidewall contact angle functions within an established slope flatness metric $\epsilon$.

According to another embodiment of the present invention the method comprises converting the generalized sidewall profile function to a plurality of lens sidewall contact angle functions defined by different combinations of sidewall profile parameters. Each of the lens sidewall contact angle functions is characterized by a degree of operational linearity between (i) a lens sidewall contact angle and a target lens fluid lateral shift along an x axis, (ii) a lens sidewall contact angle and sidewall electrode electric potential, or (iii) lens sidewall contact angle and lens focal length.

The present invention is not to be limited to the particular embodiments provided above or otherwise described herein. It is contemplated that additional embodiments are possible through modifications and variations to the embodiments described. Such modifications and variations are permissible without departing from the scope of the invention described in the specification and defined in the appended claims.

BRIEF DESCRIPTION OF THE DRAWINGS

It is believed that embodiments of the present invention will be better understood from the following description taken in conjunction with the accompanying drawings in which.

Figure 1:
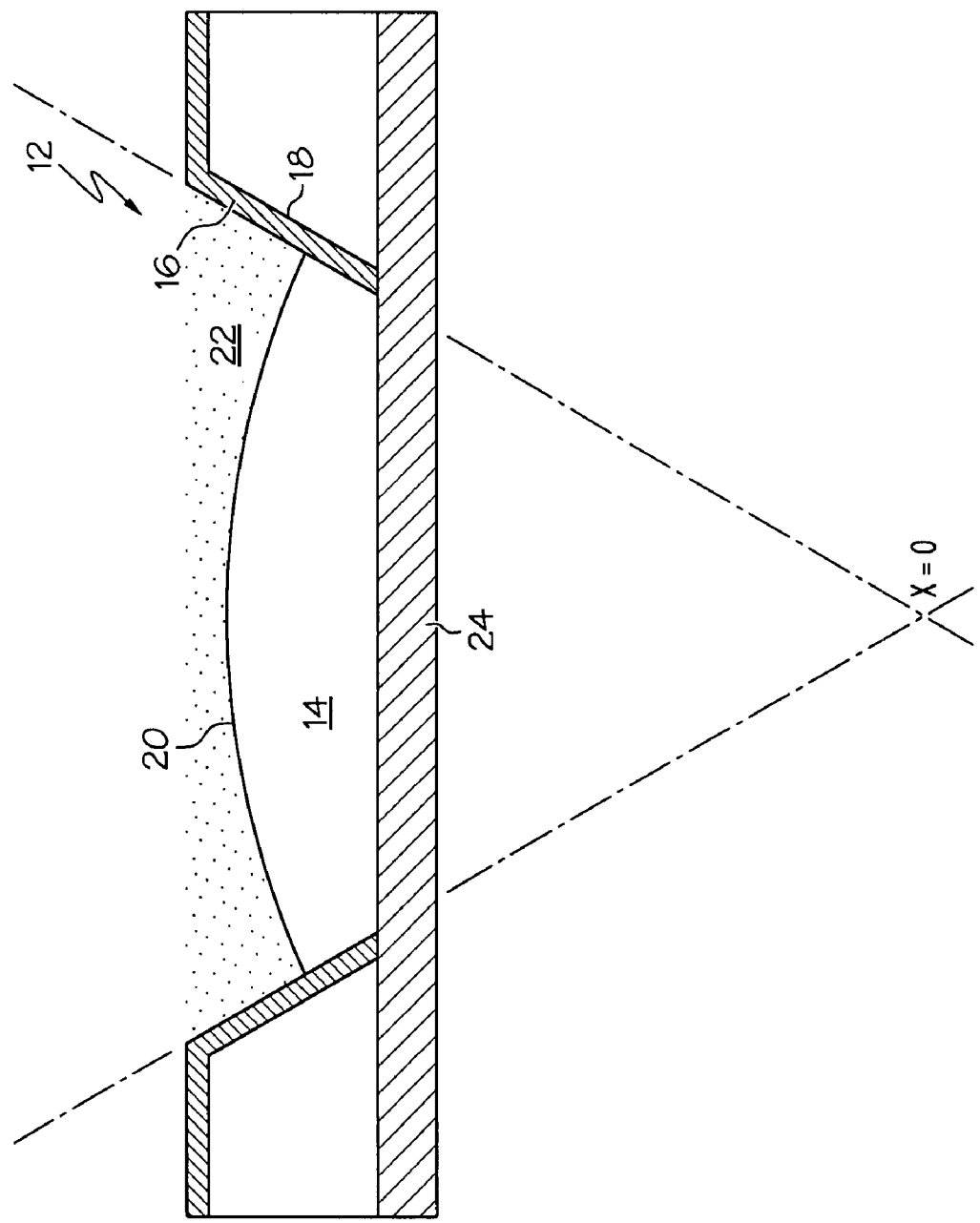
FIG. 1 is a cross-sectional view of a fluid lens.

The embodiments set forth in the drawings are illustrative in nature and are not intended to be limiting of the invention defined by the claims. Moreover, individual aspects of the drawings and the invention will be more fully apparent and understood in view of the detailed description.

DETAILED DESCRIPTION

Referring initially to FIG. 1, a fluid lens 10 generally comprises a fluid lens reservoir 12, an electrically responsive lens fluid 14, and one or more control electrodes 16. Generally, the fluid lens reservoir 12 is defined at least in part by one or more sidewalls 18, while the lens fluid 14 is at least partially held within the fluid lens reservoir 12. The control electrodes 16, meanwhile, may be disposed along or extend generally parallel to at least one of the sidewalls 18 of the fluid lens reservoir 12.

Generally, the fluid lens reservoir 12 comprises an optical aperture or window 24 that allows light to propagate through the lens fluid 14 held therein. The shape of the surface 20 of the lens fluid 14 can be used to focus and steer an optical beam directed through the lens 10. The shape of the surface 20 of the electrically responsive lens fluid 14 can be altered by the application of electric potentials to the control electrodes 16 disposed along the sidewalls 18 of the reservoir 12. By adjusting independently the electric potentials of the control electrodes 16, it is possible to shift the lens fluid 14 laterally, thereby altering the shape of the surface 20 of the lens fluid 14 and the focus and/or direction of the optical beam projecting therethrough. For example, the fluid lens 14 may be configured such that the surface 20 of the lens fluid 14 comprises a substantially cylindrical profile when the control electrodes 16 are in an unbiased state and a skewed cylindrical profile when the control electrodes 16 are biased to generate an electric field that alters the curvature of the surface 20 of the lens fluid 14. For purposes of describing embodiments of the present invention herein, the lens fluid lateral position is identified according to the highest point of the lens fluid where the slope of a surface of the lens fluid equals zero.

A complementary but distinct fluid 22 may be provided within lens reservoir 12 to help stabilize and facilitate proper control of the lens fluid 14. For example, and not by way of limitation, where an electrically responsive oil is used as the lens fluid 14, an aqueous-based fluid 22 may be encased within the lens 10 and disposed over the oil held within the fluid reservoir 12 of the lens 10. This type of configuration is illustrated clearly in U.S. Pat. Nos. 6,538,823, 6,778,328, and 6,936,809. Only those portions of the aforementioned patents necessary to facilitate an understanding of the general concepts of fluid lens design and the manner in which an electric field can be used to alter the optical properties of a fluid lens are incorporated herein by reference.

Figure 2:
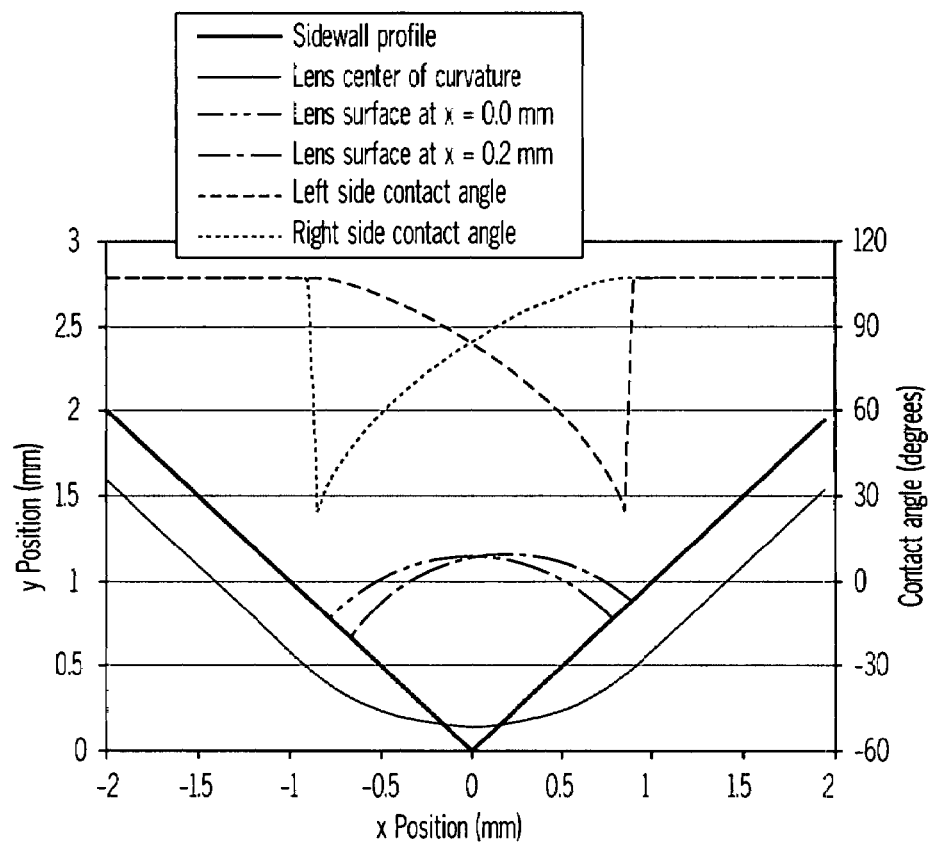
FIG. 2 is a graphical illustration depicting a lens fluid lateral shift in a fluid lens.

The shifting of a lens fluid through adjustment of electric potentials is illustrated in FIG. 2. FIG. 2 depicts a cross-sectional view a fluid lens comprising a V-groove fluid lens reservoir having a defined sidewall profile and an electrically responsive lens fluid. Here, the lens radius of curvature R of the lens fluid is given as 1.0 mm and the cross-sectional area A of the lens fluid is given as 1.0 mm². The lens fluid is presented at two x positions along an x axis: 1) where x=0.0 mm and the electric potentials of the control electrodes are in an unbiased state and 2) where x=0.2 mm and the electric potentials of the control electrodes are biased, causing the lens fluid to shift laterally along the x axis. Thus, the surface of the lens fluid is shown in FIG. 2 for a lateral displacement of x=+0.2 mm. FIG. 2 also illustrates a lens fluid center of curvature as the lens fluid is shifted laterally and left and right lens sidewall contact angles. It may be noted that for symmetric sidewall profiles (e.g. V-groove profile), the left and right lens sidewall contact angles are mirror images of each other and, as such, may be expressed as $\theta_{left}(x)=\theta_{Right}(-x)$. Therefore, to simplify the description herein, only a single or the right lens sidewall contact angle and its related function, are discussed. Further, for the purposes of describing and defining the present invention, it is noted that a fluid that is "electrically responsive" may be an electrically conductive fluid, a poled fluid of limited conductivity, or any fluid that can be arranged to physically respond to the application of an electric field thereto, in the manner described herein. The control electrodes may preferably comprise independently controllable electrodes to maximize operational versatility.

Figure 3:
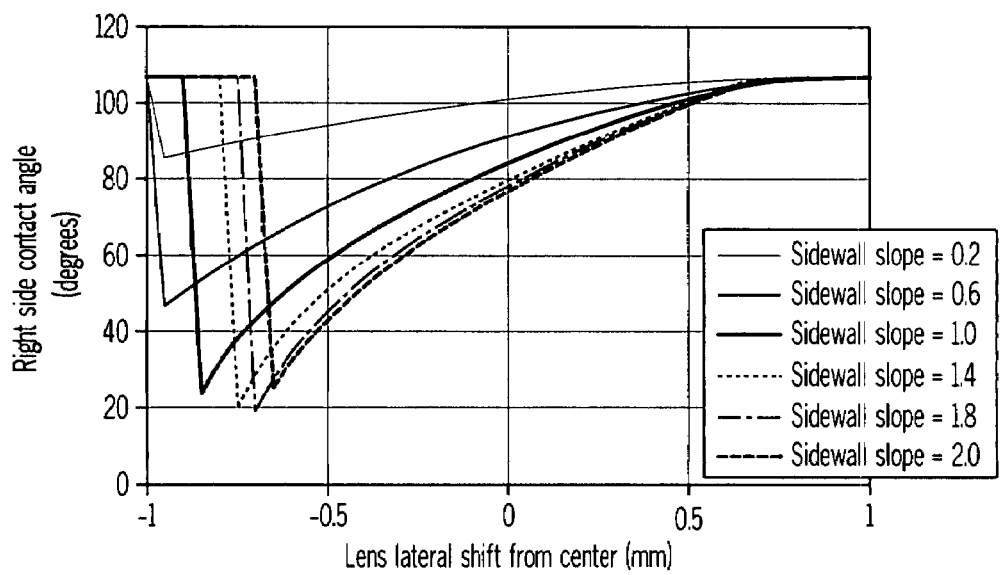
FIG. 3 is a graphical illustration depicting the effect of different sidewall derivatives on lens sidewall contact angle function.

FIG. 3 graphically illustrates how a right lens sidewall contact angle changes as a V-groove profile sidewall derivative is changed from x=0.2 to x=2.0. As apparent from FIG. 3, V-groove profiles with steeper sidewalls generally produce larger changes in the right lens sidewall contact angle than do V-groove profiles having shallow sidewalls. Depending on the requirements for a particular fluid lens focusing and/or optical beam steering application, one V-groove reservoir profile may produce more desirable performance characteristics than would another profile. For example, where large lateral shifts of the lens fluid are required, shallow sidewall profiles may be preferred since such applications will require a smaller lens sidewall contact angle control range. Another example is where high-resolution lateral lens fluid positioning is required, steep sidewall profiles may be preferred so as to reduce the amount of lateral shift of a lens fluid associated with a given, controlled change in lens sidewall contact angle.

Therefore, according to the requirements for a particular fluid lens application, it may be desirable to select a fluid lens reservoir comprising a profile most appropriate for obtaining linear relationships between an input variable (e.g. lens sidewall contact angle) and an output variable (e.g. lens fluid lateral offset position). As such, to accommodate appropriately a variety of fluid lens applications, the fluid lens reservoir may comprise one or more of any variety of profiles, such as, but not limited to, a V-groove profile, a hyperbolic profile, a parabolic profile, a circular profile, a rectangular profile, or other linear, non-linear profile, or combinations thereof.

The sidewall profile optimization schemes described herein help ensure that an appropriate reservoir profile is provided and that a linear response between lens sidewall contact angle and lens fluid lateral offset is produced. In addition, the sidewall profile optimization schemes described herein can permit simplification of external control electronics by eliminating look-up tables or other specialized circuitry or programming typically needed for profiles characterized by non-linear responses. As used herein, the terms "optimal," "optimized," and "optimization," with respect to a sidewall profile, do not require that a perfect, or even a best possible, sidewall profile be identified and/or incorporated into and utilized in a fluid lens. Rather, the terms "optimal," "optimized," and "optimization," with respect to a sidewall profile, are to be understood simply to mean a sidewall profile with at least some degree of operational linearity.

Embodiments of the present invention generally relate to methods of constructing fluid lenses comprising an optimized sidewall profile. According to one method of constructing a fluid lens, a generalized sidewall profile function is established. For example, this generalized sidewall profile function can be represented as:

$$f(x)=C_0+C_1|x|+C_2|x|^2+C_3|x|^3+\ldots+C_n|x|^n.$$

This generalized sidewall profile function $f(x)$ may then be converted to a plurality of lens sidewall contact angle functions $f(x_1)$, $f(x_2)$, . . . defined by different combinations of sidewall profile parameters. More specifically, the generalized sidewall profile function $f(x)$ may be converted to the plurality of lens sidewall contact angle functions $f(x_1)$, $f(x_2)$, . . . by changing the coefficients $C_0$, $C_1$, $C_2$, $C_3$, $C_n$. In addition, the generalized sidewall profile function $f(x)$ may be converted to the plurality of lens sidewall contact angle functions $f(x_1)$, $f(x_2)$, . . . by setting $C_0=0$ since $C_0$ serves as a constant offset term and generally has no influence on lens sidewall contact angle.

Each of the lens sidewall contact angle functions $f(x_1)$, $f(x_2)$, . . . derived from the generalized sidewall profile function $f(x)$ will be characterized by a given degree of operational linearity between the lens sidewall contact angle and the target lens fluid lateral shift along the x axis. According to the method, these respective degrees of operational linearity are determined for each of the lens sidewall contact angle functions over a range of positions along the x axis by assessing derivative uniformity of each of the lens sidewall contact angle functions within an established slope flatness metric $\epsilon$.

More particularly, derivative uniformity can be assessed by using the following equations:

$$\left|\frac{\left.\frac{d\theta_{Right}}{dx}\right|_{x=0}-\left.\frac{d\theta_{Right}}{dx}\right|_{x=x_L}}{\left.\frac{d\theta_{Right}}{dx}\right|_{x=0}}\right|\leq\varepsilon$$

and $$\left|\frac{\left.\frac{d\theta_{Right}}{dx}\right|_{x=0}-\left.\frac{d\theta_{Right}}{dx}\right|_{x=-x_L}}{\left.\frac{d\theta_{Right}}{dx}\right|_{x=0}}\right|\leq\varepsilon$$

In these equations, $d\theta_{Right}$ refers to the derivative of the right lens sidewall contact angle function under assessment, while $X_L$ refers to the degree of operational linearity of the lens sidewall contact angle function under assessment. The slope flatness metric $\epsilon$ may define a permissible range of non-uniformity in assessing the derivative uniformity of the lens sidewall contact angle functions. The slope flatness metric $\epsilon$ generally is established at any relatively small value. For example, according to one embodiment, the slope flatness metric $\epsilon$ is about ±5%. Since, however, the slope flatness metric $\epsilon$ is a function of requirements of an application of the fluid lens, it is contemplated that the slope flatness metric $\epsilon$ can be established at any other value according to those requirements of the particular fluid lens application.

After the respective degrees of operational linearity of the lens sidewall contact angle functions have been determined, the method further comprises evaluating these respective degrees of operational linearity to identify an optimized sidewall profile. The optimized sidewall profile generally, but not necessarily, is identified as the sidewall profile configured to result in the desired performance characteristics for a particular fluid lens application. This generally is the sidewall profile comprising the greatest degree of operational linearity providing the broadest linear relationship between lens sidewall contact angle and lens fluid lateral shift.

Once the optimized sidewall profile for a particular fluid lens application is identified, the method comprises constructing the fluid lens by forming the fluid lens reservoir with at least one sidewall comprising the optimized sidewall profile. Thereby, a fluid lens configured to produce a linear relationship between lens sidewall contact angle and lens fluid lateral shift and result in the desired performance characteristics of a particular fluid lens application is constructed.

According to one embodiment, the respective degrees of operational linearity of the lens sidewall contact angle functions are determined where the range of positions along the x axis includes a position where x=0. According to another embodiment, however, the respective degrees of operational linearity are determined where the range of positions along the x axis exclude a position where x=0. Additionally or alternatively, the respective degrees of operational linearity of the lens sidewall contact angle functions are determined where the range of positions along the x axis includes positions where x>0 or x<0.

Figure 4:
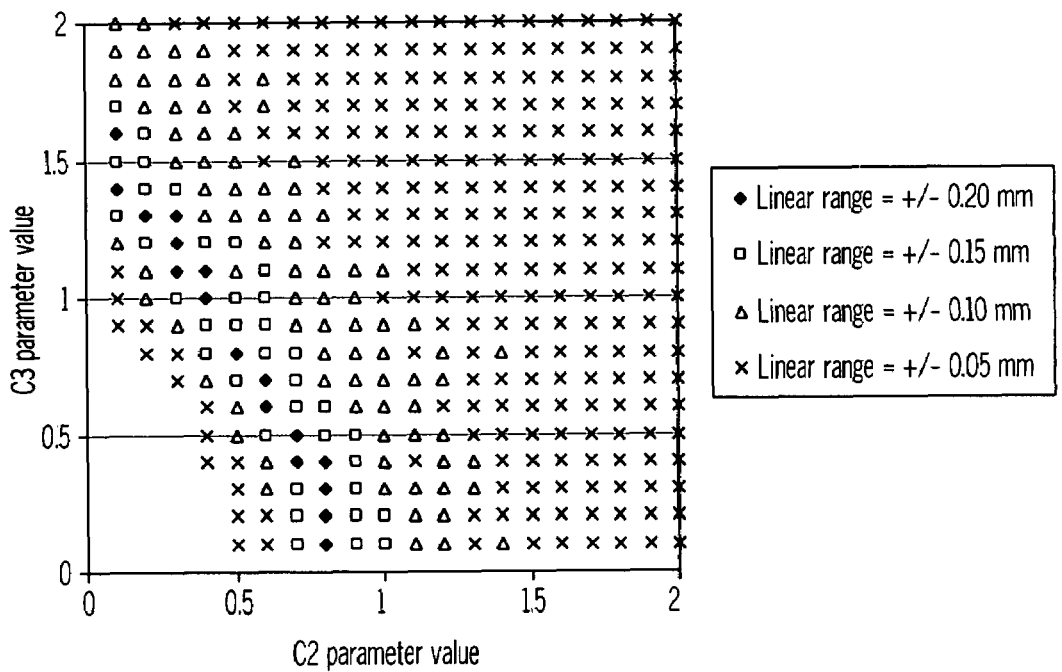
FIG. 4 is a graphical illustration depicting change in degree of operational linearity with changes in sidewall profile parameters.
Figure 5:
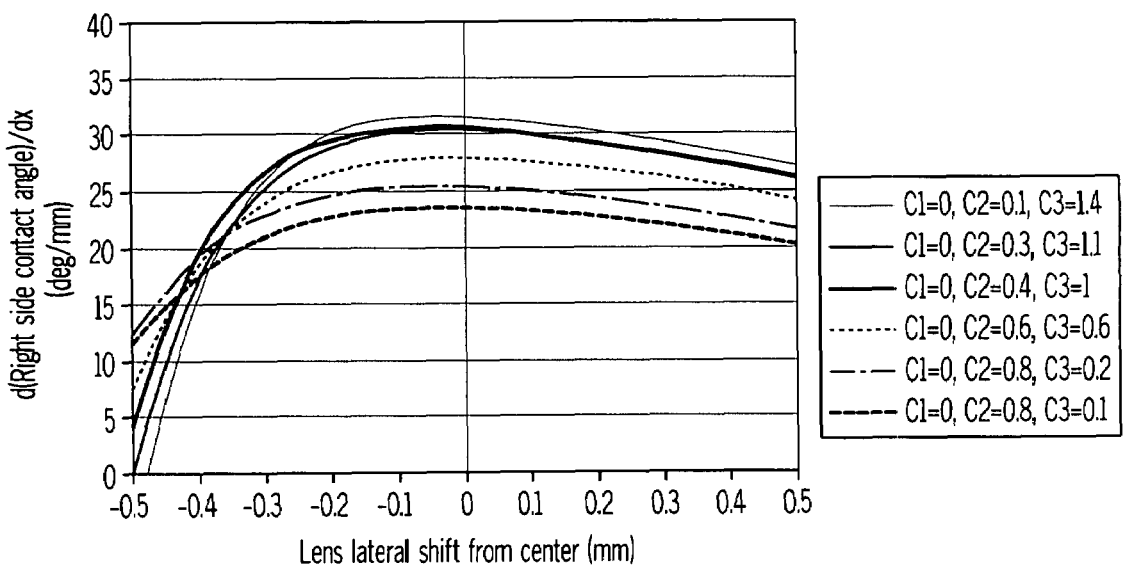
FIG. 5 is a graphical illustration depicting the relationships between lens sidewall contact angle and lens fluid lateral shift position.
Figure 6:
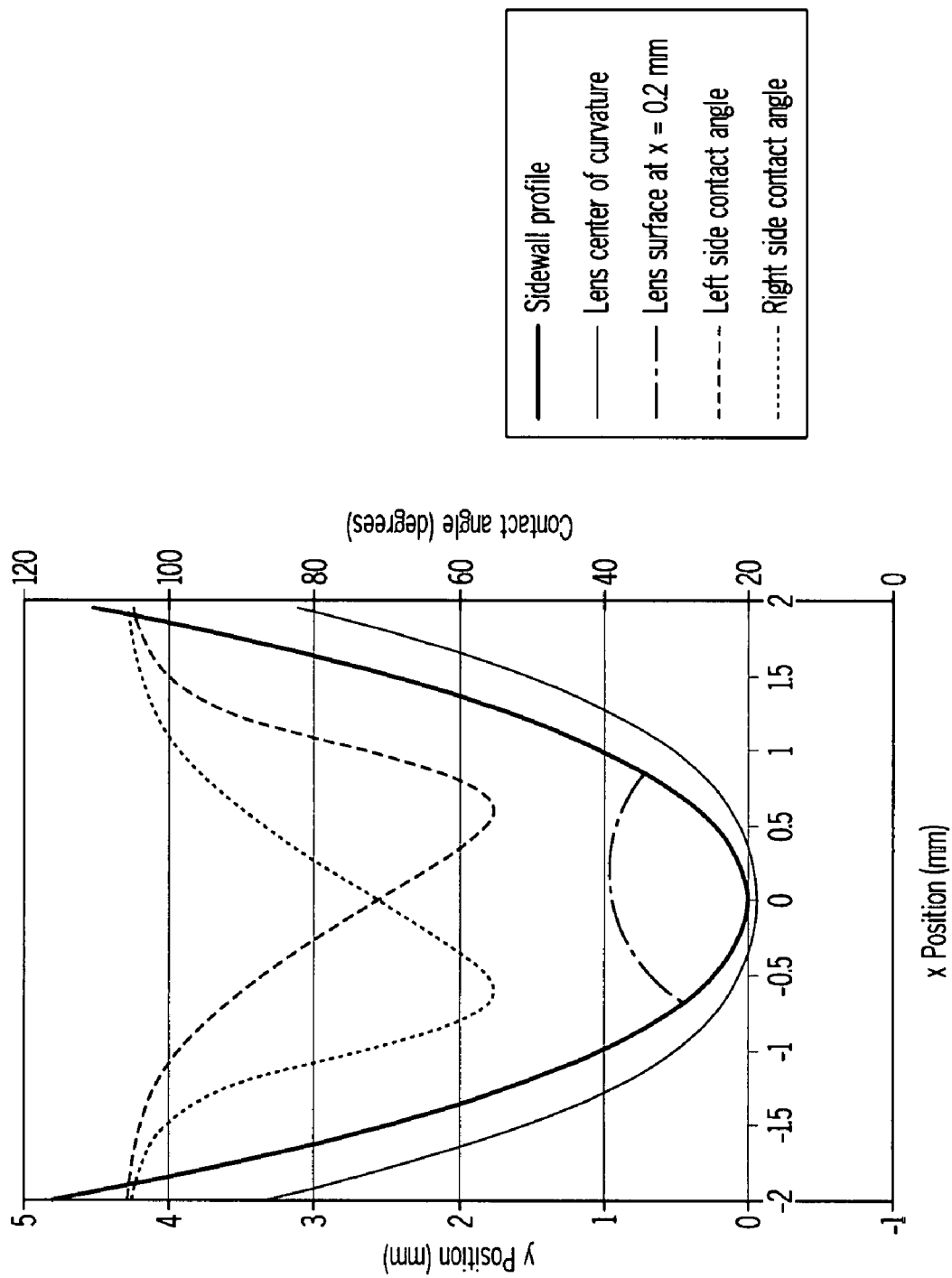
FIG. 6 is a graphical illustration depicting a fluid lens.

The sidewall profile optimization process described can be demonstrated further with reference to FIGS. 4, 5, and 6. FIG. 4 graphically illustrates simulations that were performed with the objective of exploring degrees of operational linearity $X_L$. More particularly, the objectives of the simulations were to explore a range of values for sidewall profile parameters $C_2$ and $C_3$, while maintaining $C_1=0$ since the derivative of the lens sidewall contact angle function only increases as the $C_1$ value increases, and to evaluate the right lens sidewall contact angle function degree of operational linearity $X_L$. Again, here, the lens radius of curvature R was set to equal 1.0 mm and the cross-sectional area A equal to 1.0 mm². In addition, the slope flatness metric ϵ equaled ±5%.

FIG. 4 illustrates that the right lens sidewall contact angle function derivatives reach zero where x=0 for certain values of $C_2$ and $C_3$. Further, FIG. 4 shows that the degree of operational linearity is greatest ($X_L$=0.20 mm) for a range of $C_2$ and $C_3$ values that form a line between $C_2$=0.8, $C_3$=0 and $C_2$=0, $C_3$=1.5. The occasional irregularities visible in the degrees of operational linearity are due to the effect of small cross-sectional area discretization errors induced during the simulations. It should be apparent that these errors do not obscure the general trends in degree of operational linearity $X_L$ as a function of $C_2$ and $C_3$.

FIG. 5 graphically illustrates the right lens sidewall contact angle derivatives of the simulations shown in FIG. 4 to confirm that the derivative of the right lens sidewall contact angle function was zero near x=0. More particularly, in FIG. 5, the right lens sidewall contact angle function derivatives are plotted for a number $C_1$, $C_2$, $C_3$ sidewall profiles where the degree of linearity $X_L$=0.20 mm (shown as diamonds in FIG. 4). These plots illustrate the relative flatness of the lens sidewall contact angle derivatives, which implies the existence of linear relationships between right lens sidewall contact angle and target lens fluid lateral shift position x. While each curve in FIG. 5 is substantially flat, the value of the derivative at x=0 varies by over 40%. This derivative variation provides a designer of fluid lenses with an additional degree of freedom in selecting sidewall profiles since, as shown for the V-groove profile above, the derivative can be adjusted to optimize maximum fluid lens tuning range and/or lateral placement accuracy.

Further, FIG. 6 illustrates the linear relationship between the right lens sidewall contact angle and the target lens fluid lateral shift position x. More particularly, FIG. 6 plots sidewall profiles and lens sidewall contact angles for a selected profile where f(x) ($C_1$=0, $C_2$=0.8, and $C_3$=0.2). Both left and right lens sidewall contact angles are plotted as a function of lens fluid lateral displacement. Here, again, the radius of curvature R of the lens fluid is set to equal 1.0 mm and the cross-sectional area A of the lens fluid is set to equal 1.0 mm².

Figure 7:
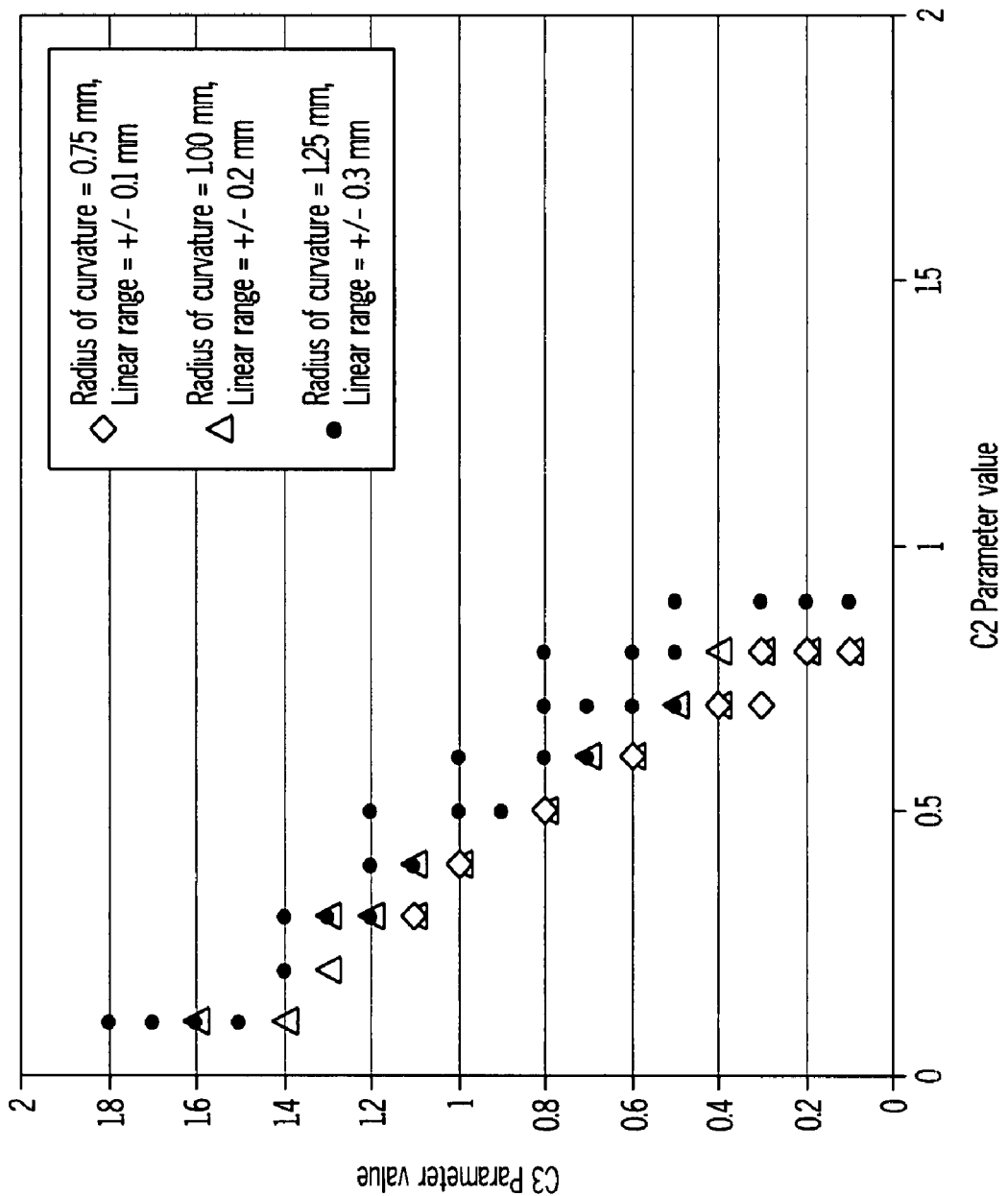
FIG. 7 is a graphical illustration depicting the influence of lens radius of curvature on degrees of operational linearity with changes in sidewall profile parameters.

FIG. 7 graphically illustrates simulations performed to explore this influence of variation of the lens radius of curvature R on optimal sidewall profiles and degrees of operational linearity, while assuming the cross-sectional area A remains constant. This variation of the lens radius of curvature R may be important for fluid lens applications where both optical beam focus and lens fluid lateral shift are required over a range of focus and lens fluid lateral shift values. More particularly, FIG. 7 illustrates degrees of operational linearity $X_L$ for three different values for the lens radius of curvature R as sidewall profile parameters $C_2$ and $C_3$ are adjusted and $C_1$=0 and cross-sectional area A=1.0 mm². These simulations reveal that as the radius of curvature R is increased, the degree of operational linearity also increases (from $X_L$=0.1 mm for R=0.75 mm up to $X_L$=0.3 mm for R=1.25 mm). These results show that lens fluids with larger radii of curvature (e.g. longer focal lengths) may be required if larger degrees of operational linearity are desirable.

The size of the domain of $C_2$ and $C_3$ values where degrees of operational linearity are obtained for a given lens radius of curvature R value also increases as R increases. Further, the plots of FIG. 7 reveal that a limited set of $C_2$ and $C_3$ values where the degree of operational linearity is greatest regardless of the lens radius of curvature R value selected. This is demonstrated in FIG. 7 over the range of R=0.75 mm to R=1.25 mm. Additional simulations can be performed to explore optimizations of sidewall profile f(x) involving higher order terms. FIG. 7 indicates that if the sidewall profile f(x) order is limited to n=2, then a desirable profile for a linear lens sidewall contact angle function near x=0 would be $C_1$=0, $C_2$=0.8.

In addition to creating linear relationships between lens sidewall contact angle and lens fluid lateral shift position, sidewall profile optimizations according to the present invention can also be utilized to compensate for other sources of non-linearity that might exist in a fluid lens. For example, a non-linear transfer function might exist between the control electrode electric potential applied to the electrically responsive lens fluid and the resulting lens sidewall contact angle. Another example is where non-linear transfer functions might exist between a lens sidewall contact angle and a lens focal length, perhaps via a change in the lens radius of curvature R.

Use of this compensation approach may simplify the fluid lens by re-directing all non-linear response complexity into the methods of constructing a fluid lens comprising an optimal sidewall, as described herein. Further, non-linear sidewall profiles may be easily and accurately constructed via standard mass production manufacturing techniques, such as, but not limited to, injection molding, stamping, embossing, etching, or combinations thereof, of sidewall profiles.

It is noted that recitations herein of a component of the present invention being "configured" in a particular way, "configured" to embody a particular property or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present invention or to emphasize alternative or additional features that may or may not be utilized in a particular embodiment of the present invention.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention may be identified herein as preferred, particularly advantageous, or desirable it is contemplated that the present invention is not necessarily limited to these preferred aspects of the invention.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of constructing a fluid lens comprising a fluid lens reservoir defined at least in part by one or more sidewalls, the method comprising:

establishing a generalized sidewall profile function;

converting the generalized sidewall profile function to a plurality of lens sidewall contact angle functions defined by different combinations of sidewall profile parameters, wherein each of the lens sidewall contact angle functions is characterized by a degree of operational linearity between a lens sidewall contact angle and a target lens fluid lateral shift along an x axis;

determining respective degrees of operational linearity of the lens sidewall contact angle functions over a range of positions along the x axis by assessing derivative uniformity of each of the lens sidewall contact angle functions within an established slope flatness metric $\epsilon$;

evaluating the respective degrees of operational linearity of the lens sidewall contact angle functions to identify an optimized sidewall profile; and constructing the fluid lens by forming the fluid lens reservoir with at least one sidewall comprising the optimized sidewall profile.

2. The method of claim 1, wherein:

the generalized sidewall profile function can be represented as $$f(x) = C_0 + C_1|x| + C_2|x|^2 + C_3|x|^3 + \ldots + C_n|x|^n;$$ and the generalized sidewall profile function is converted to the plurality of lens sidewall contact angle functions by changing $C_0$, $C_1$, $C_2$, $C_3$, $C_n$, or combinations thereof.

3. The method of claim 2, wherein the generalized sidewall profile function is converted to the plurality of lens sidewall contact angle functions by setting $C_0=0$.

4. The method of claim 1, wherein the derivative uniformity of each of the lens sidewall contact angle functions is assessed by calculating the following equation:

$$\left| \frac{\left.\frac{d\theta_{Right}}{dx}\right|_{x=0} - \left.\frac{d\theta_{Right}}{dx}\right|_{x=x_L}}{\left.\frac{d\theta_{Right}}{dx}\right|_{x=0}} \right| \leq \varepsilon$$

and $$\left| \frac{\left.\frac{d\theta_{Right}}{dx}\right|_{x=0} - \left.\frac{d\theta_{Right}}{dx}\right|_{x=-x_L}}{\left.\frac{d\theta_{Right}}{dx}\right|_{x=0}} \right| \leq \varepsilon$$

wherein:

$d\theta_{Right}$ refers to the derivative of the lens sidewall contact angle function under assessment, and $X_L$ refers to the degree of operational linearity of the lens sidewall contact angle function under assessment.

5. The method of claim 1, wherein the respective degrees of operational linearity of the lens sidewall contact angle functions are determined where the range of positions along the x axis includes a position where x=0.

6. The method of claim 1, wherein the respective degrees of operational linearity of the lens sidewall contact angle functions are determined where the range of positions along the x axis excludes a position where x=0.

7. The method of claim 6, wherein the respective degrees of operational linearity of the lens sidewall contact angle functions are determined where the range of positions along the x axis includes positions where x>0 or x<0.

8. The method of claim 1, wherein the respective degrees of operational linearity of the lens sidewall contact angle functions are determined where the range of positions along the x axis includes positions where x>0 and x<0.

9. The method of claim 1, wherein the slope flatness metric $\epsilon$ defines a permissible range of non-uniformity in assessing the derivative uniformity of the lens sidewall contact angle functions.

10. The method of claim 9, wherein the slope flatness metric $\epsilon$ is about ±5%.

11. The method of claim 9, wherein the slope flatness metric $\epsilon$ is a function of requirements of an application of the fluid lens.

12. The method of claim 1, wherein the fluid lens comprises an electrically responsive lens fluid at least partially held within the fluid lens reservoir and one or more control electrodes.

13. The method of claim 12, wherein the control electrodes are disposed along or extend generally parallel to the sidewall of the fluid lens reservoir comprising the optimized sidewall profile.

14. The method of claim 12, wherein the fluid lens is configured such that a surface of the lens fluid comprises:

a substantially cylindrical profile when the control electrodes are in an unbiased state, and a skewed cylindrical profile when the control electrodes are biased to generate an electric field that alters a curvature of the surface of the lens fluid.

15. The method of claim 1, wherein the fluid lens reservoir comprises a V-groove profile, a hyperbolic profile, a parabolic profile, a circular profile, a rectangular profile, or other linear, non-linear profile, or a combination thereof.

16. A method of constructing a fluid lens comprising a fluid lens reservoir defined at least in part by one or more sidewalls, an electrically responsive lens fluid at least partially held within the fluid lens reservoir, and one or more control electrodes, the method comprising:

establishing a generalized sidewall profile function;

converting the generalized sidewall profile function to a plurality of lens sidewall contact angle functions defined by different combinations of sidewall profile parameters, wherein each of the lens sidewall contact angle functions is characterized by a degree of operational linearity between a lens sidewall contact angle and a target lens fluid lateral shift along an x axis;

determining respective degrees of operational linearity of the lens sidewall contact angle functions over a range of positions along the x axis including a position where x=0 by assessing derivative uniformity of each of the lens sidewall contact angle functions within an established slope flatness metric $\epsilon$;

evaluating the respective degrees of operational linearity of the lens sidewall contact angle functions to identify an optimized sidewall profile; and constructing the fluid lens by forming the fluid lens reservoir with at least one sidewall comprising the optimized sidewall profile and by disposing the control electrodes along the sidewalls of the fluid lens reservoir that comprise the optimized sidewall profile.

17. The method of claim 16, wherein:

the generalized sidewall profile function can be represented as $$f(x) = C_0 + C_1|x| + C_2|x|^2 + C_3|x|^3 + \ldots + C_n|x|^n;\text{ and}$$

the generalized sidewall profile function is converted to the plurality of lens sidewall contact angle functions by changing $C_0$, $C_1$, $C_2$, $C_3$, $C_n$, or combinations thereof.

18. The method of claim 16, wherein the derivative uniformity of each of the lens sidewall contact angle functions is assessed by calculating the following equation:

$$\left| \frac{\left.\frac{d\theta_{Right}}{dx}\right|_{x=0} - \left.\frac{d\theta_{Right}}{dx}\right|_{x=x_L}}{\left.\frac{d\theta_{Right}}{dx}\right|_{x=0}} \right| \leq \varepsilon$$

and $$\left| \frac{\left.\frac{d\theta_{Right}}{dx}\right|_{x=0} - \left.\frac{d\theta_{Right}}{dx}\right|_{x=-x_L}}{\left.\frac{d\theta_{Right}}{dx}\right|_{x=0}} \right| \leq \varepsilon$$

wherein:

$d\theta_{Right}$ refers to the derivative of the lens sidewall contact angle function under assessment, and $X_L$ refers to the degree of operational linearity of the lens sidewall contact angle function under assessment.

19. A method of constructing a fluid lens comprising a fluid lens reservoir defined at least in part by one or more sidewalls, the method comprising:

establishing a generalized sidewall profile function;

converting the generalized sidewall profile function to a plurality of lens sidewall contact angle functions defined by different combinations of sidewall profile parameters, wherein each of the lens sidewall contact angle functions is characterized by a degree of operational linearity between (i) a lens sidewall contact angle and a target lens fluid lateral shift along an x axis, (ii) a lens sidewall contact angle and sidewall electrode electric potential, or (iii) lens sidewall contact angle and lens focal length;

determining respective degrees of operational linearity of the lens sidewall contact angle functions over a range of positions along the x axis by assessing derivative uniformity of each of the lens sidewall contact angle functions within an established slope flatness metric $\epsilon$;

evaluating the respective degrees of operational linearity of the lens sidewall contact angle functions to identify an optimized sidewall profile; and constructing the fluid lens by forming the fluid lens reservoir with at least one sidewall comprising the optimized sidewall profile.

* * * * *